(12) United States Patent
Bouchier et al.

(10) Patent No.: US 12,474,580 B2
(45) Date of Patent: Nov. 18, 2025

(54) SET OF SEMI-FINISHED LENSES WITH HOLOGRAPHIC COMPONENTS

(71) Applicant: Essilor International, Charenton-le-Pont (FR)

(72) Inventors: Aude Bouchier, Charenton-le-Pont (FR); Samuel Archambeau, Charenton-le-Pont (FR); Karin Scherer, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 566 days.

(21) Appl. No.: 17/620,307

(22) PCT Filed: Jun. 19, 2020

(86) PCT No.: PCT/EP2020/067190
§ 371 (c)(1),
(2) Date: Dec. 17, 2021

(87) PCT Pub. No.: WO2020/254628
PCT Pub. Date: Dec. 24, 2020

(65) Prior Publication Data
US 2022/0244542 A1    Aug. 4, 2022

(30) Foreign Application Priority Data

Jun. 21, 2019  (EP) .................................... 19305814

(51) Int. Cl.
*G02C 7/02*   (2006.01)
*B29D 11/00*   (2006.01)
(Continued)

(52) U.S. Cl.
CPC .... *G02B 27/0172* (2013.01); *B29D 11/00432* (2013.01); *B29D 11/00865* (2013.01);
(Continued)

(58) Field of Classification Search
CPC ........ G02B 27/0172; G02B 2027/0105; G02B 2027/019; G02B 2027/0174;
(Continued)

(56) References Cited

U.S. PATENT DOCUMENTS 4,582,389 A * 4/1986 Wood ................. G02B 27/0103
359/14
4,786,125 A * 11/1988 Magarinos .............. A61F 9/022
351/44
(Continued)

FOREIGN PATENT DOCUMENTS

EP   2 667 242 A1   11/2013
EP   3 435 139 A1   1/2019
(Continued)

OTHER PUBLICATIONS

International Search Report issued on Sep. 10, 2020 in PCT/EP2020/067190 filed Jun. 19, 2020, 3 pages.
(Continued)

*Primary Examiner* — Audrey Y Chang
(74) *Attorney, Agent, or Firm* — Oblon, McClelland, Maier & Neustadt, L.L.P.

(57) ABSTRACT

A method for manufacturing a set of semi-finished lenses and a lens from a semi-finished lens of the set and a set of semi-finished lenses each intended to be used in the manufacturing of a finished lens of determined target power, each semi-finished lens having a base curve chosen among a number N of base curves, wherein each base curve is associated to a respective range of powers of finished ophthalmic lenses to be manufactured, and each semi-finished lens of the set comprises a recorded holographic component, wherein the holographic components of the set exhibit a limited number of configurations, and each holo-
(Continued)

graphic component configuration is associated exclusively to one base curve among the N base curves.

14 Claims, 4 Drawing Sheets

(51) Int. Cl.
 *G02B 27/01* (2006.01)
 *G02C 7/14* (2006.01)
(52) U.S. Cl.
 CPC ............... *G02C 7/027* (2013.01); *G02C 7/14* (2013.01); *G02B 2027/0105* (2013.01); *G02B 2027/0109* (2013.01); *G02B 2027/0174* (2013.01); *G02B 2027/0178* (2013.01)
(58) Field of Classification Search
 CPC .. G02B 2027/0178; G02C 7/027; G02C 7/14; B29D 11/00432; B29D 11/00865
 USPC ........ 359/8, 14, 15, 19; 351/159.74, 159.75, 351/159.11, 159.73
 See application file for complete search history.

(56) References Cited

U.S. PATENT DOCUMENTS

| | | | |
|---|---|---|---|
| 5,349,394 | A | 9/1994 | Freeman et al. |
| 6,139,147 | A * | 10/2000 | Zhang .................... G02C 7/043 264/1.36 |
| 7,008,690 | B2 | 3/2006 | Caron et al. |
| 2004/0145700 | A1 | 7/2004 | Miniutti et al. |
| 2013/0335700 | A1 | 12/2013 | Watanabe |
| 2017/0108709 | A1* | 4/2017 | Woodland ................ G02C 7/02 |
| 2018/0095279 | A1 | 4/2018 | Bouchier et al. |
| 2018/0129057 | A1* | 5/2018 | Morrison ........... G02B 27/0911 |
| 2018/0173007 | A1* | 6/2018 | Putz ....................... G02C 7/086 |
| 2018/0372935 | A1 | 12/2018 | Alexander et al. |
| 2019/0101761 | A1 | 4/2019 | Ihmels |
| 2019/0315080 | A1 | 10/2019 | Lechat et al. |
| 2020/0117023 | A1 | 4/2020 | Puetz et al. |
| 2020/0142199 | A1 | 5/2020 | Bouchier et al. |
| 2020/0233128 | A1 | 7/2020 | Bouchier et al. |

FOREIGN PATENT DOCUMENTS

| | | |
|---|---|---|
| JP | 4-225314 A | 8/1992 |
| JP | 2013-246317 A | 12/2013 |
| JP | 2017-510834 A | 4/2017 |
| JP | 2018-511834 A | 4/2018 |
| JP | 2018-517942 A | 7/2018 |
| JP | 2019-500650 A | 1/2019 |
| WO | WO 2016/156614 A1 | 10/2016 |
| WO | WO 2018/054984 A1 | 3/2018 |
| WO | WO 2018/099660 A1 | 6/2018 |

OTHER PUBLICATIONS

Younger Optics, "Technical Specifications for Trilogy® Lenses", XP055651973, 2017, pp. 1-4.
Office Action dated Sep. 24, 2024, issued in counterpart JP Application No. 2021-573908, with English Translation. (15 pages).

* cited by examiner

SET OF SEMI-FINISHED LENSES WITH HOLOGRAPHIC COMPONENTS

FIELD OF THE INVENTION

The invention relates to a set of semi-finished lenses integrating recorded holographic components, for the manufacturing of lenses that can be used in the field of smart glasses and augmented reality.

BACKGROUND OF THE INVENTION

Head-mounted devices with display features are already well known. Such devices allow the wearer to visualize images or text for augmented reality.

To this end, it is known from document WO2016/156614 a method for providing an ophthalmic lens intended to be fitted onto a frame and worn by a wearer, wherein the lens comprises a holographic mirror which is configured to reflect light generated by an image source integrated in the frame.

The mirror is holographic in that it is recorded using a holography process. More specifically, the holographic mirror is obtained by providing on the ophthalmic lens a layer of unrecorded medium, and recording the holographic mirror by generating interferences between a reference beam and an illumination beam in the holographic medium.

Depending on the configuration of the beams during the recording step, the mirror can be imparted an optical function that is able to modify the wavefront of the light beam stemming from the image source, upon reflection onto the mirror. Thus, the recording can be performed according to the configuration of the lens and the frame, and optionally to some features of the wearer.

In particular, for a wearer being ametropic, it is necessary to ensure that the glasses will ensure suitable correction not only for "natural vision", which is the vision of the environment surrounding the wearer, but also for the visualization of the "virtual image" which is generated by the image source and reflected by the mirror.

In view of this requirement, the document WO2016/156614 proposes to record a holographic mirror directly on a lens which is configured for correcting the vision of the wearer. Usually, the optician machines a surface of a semi-finished lens so that the lens corresponds to the prescription of the wearer. However, the recording of the holographic mirror cannot be easily made by the optician as it requires special skills and costly equipment. Further, the quality of the holographic mirror cannot be warranted and should be tested. Also, if the lens is made of a birefringent material, special recording techniques should be used to compensate the change of polarization induced by the birefringent material. Hence, the optician has to order it from a specialized laboratory, which might delay the delivery of the lens comprising the holographic mirror.

Other types of holographic components than holographic mirrors can be manufactured according to methods similar to the recording of a holographic mirror. One can mention in particular holographic filters, which are optical filters recorded using a holography process and which can filter specific wavelengths or ranges or wavelengths, in a determined direction. One can also mention holographic lenses, which can focus or collimate light in a range of wavelengths, according to a determined direction or at a determined position. Thus, the same problem is also met when recording other types of holographic components.

SUMMARY OF THE INVENTION

The purpose of the present disclosure is to provide a solution to the defects in the prior art.

In particular, one aim of the disclosure is to provide a way to provide lenses including holographic components in a cheaper and quicker way.

The above-mentioned purpose is achieved by a combination of the characteristics described in the independent claims, and subordinate claims provide for specific advantageous examples of the invention.

A method of manufacturing a set of semi-finished ophthalmic lenses, and a method of manufacturing an ophthalmic lens are also disclosed.

The present disclosure provides a set of semi-finished lenses, wherein the semi-finished lenses belonging to the set all have a base curve chosen among a limited number of base curves, and a holographic mirror, the configuration of which depends on the base curve of the semi-finished lens.

Each base curve of the limited number of base curves is made to address a range of target power of the final lens formed out of the semi-finished lens.

Therefore the present disclosure enables creating a personalized lens for a wearer, out of a finite set including a finite number of configurations of semi-finished lenses and holograms. The manufacturing of the semi-finished lenses can thus be performed in a mass production plant, and the personalization according to a correction requirement of the wearer can be made later at a step of finishing the semi-finished lens.

DESCRIPTION OF THE DRAWINGS

For a more complete understanding of the description provided herein and the advantages thereof, reference is now made to the brief descriptions below, taken in connection with the accompanying drawings and detailed description, wherein like reference represent like parts.

DETAILED DESCRIPTION OF THE INVENTION

Definitions

The following definitions are provided to describe the present disclosure.

"Holographic mirrors" (HM) are known in the art. A mirror is defined as a holographic mirror if it was recorded using a holography process. This mirror is used to reflect a light beam generated by an image source, which can be for instance a display screen, a picoprojector, etc., towards the eye of a wearer, so as to cause visualization of the image by the wearer. The holographic mirror is not used to reconstruct a recorded holographic image as is the case in traditional hologram viewing.

According to the recording configuration, the mirror can be imparted an optical function that is independent of the geometry of the layer supporting the holographic mirror. For instance, an holographic mirror may have a focal distance or not, comprise one or several zones of different functions or reflecting different wavelengths, have a determined power, etc.

A "holographic filter" is an optical filter recorded on a support with a holography process. Such filter can let through one wavelength or a range of wavelengths, in a particular direction.

A "holographic lens" is a lens which is recorded on a support thanks to a holography process. It can operate for a given wavelength or in a range of wavelengths in order to focalize light in a given direction or at a given position. On a same support a holographic lens may be configured to exhibit spectral and/or angular selectivity, have different zones of different focal distances and different spectral or angular selectivity.

In all that follows, a holographic component can refer to any one of a holographic mirror, a holographic filter and a holographic lens.

The recording of a holographic component on a support is performed with an optical arrangement, which comprises a light source, for instance a laser, emitting a light beam. Usually, a polarization beam splitter allows splitting the beam into two beams: one reference and one illumination beam, both beams illuminating the holographic medium on the same side or on opposite sides depending on the type of holographic component. Interferences caused by the reference beam and illumination beam on the holographic recording medium allow recording the holographic component. The configurations of the reference beam and the illumination beam allow adapting the function and configuration of the holographic component. For instance in the case of holographic mirrors, once the optical arrangement is set (e.g. geometry, sizes of the beams, etc.), features of the holographic mirror can be modified by varying one or more parameters, including the power ratio between the two beams (impacts the fringe contrast and the diffraction efficiency), the exposure time (impacts the diffraction and diffusion efficiency), and the possible use of rotatable supports on which are positioned polarization maintaining fibers through which the reference beam and illumination beam are transmitted (impacts the polarizations of the beams when exiting the fibers). The skilled person may refer to document WO 2016/156614 for more details about the recording setups used to achieve desired holographic component configuration.

"Head-mounted display devices" (HMD) are known in the art. Such devices are to be worn on or about the head of a wearer, including helmet-mounted displays, optical head-mounted displays, head-worn displays and the like. They include optical means for displaying an image for visualization by the wearer. The HMD may provide for the superimposed visualization of a computer generated image and a "real-life" vision field. The HMD may be monocular (single eye) or binocular (both eyes). An HMD incorporating a lens according to the present disclosure can take various forms, including eyeglasses, masks such as skiing or diving masks, goggles, etc. The HMD comprises one or more ophthalmic lenses. In preferred embodiments, the HMD is a pair of eyeglasses provided with ophthalmic lenses, which can be solar lenses.

"Image sources" (IS) are known in the art. An image source is any light source than can emit a light beam suitable for displaying the image for visualization by the wearer. Visualization occurs after the illumination beam stemming from the image source is reflected onto the holographic mirror. In embodiments of the present disclosure, the IS is typically off-axis, in that it can be located next to the temple of the wearer, for example on a temple component of a HMD, such as a temple component of spectacles. In embodiments of the present disclosure, the IS may be any image source configured for the display of virtual images (computer-generated images). It may be a screen (for instance OLED, LCD, LCOS, etc.), a phase and/or amplitude SLM (Spatial Light Modulator), taken in combination with its light source (for example laser, laser diode, etc.), a projector such as a picoprojector (MEMS or DLP, that may use LEDs, diodes, lasers, etc.) or any other source. The IS may also include any other image source (computer-generated image source) and/or control electronics and/or power supply and/or optional optical elements, etc.

Set of Semi-Finished Lenses

A set 1 of semi-finished lenses 10 according to an embodiment of the present disclosure will now be described with reference to FIGS. 1a, 1b and 2.

The semi-finished lenses 10 that belong to the set 1 are intended to be used in the manufacturing of ophthalmic lenses intended to be fitted onto a frame and worn by a wearer. The ophthalmic lenses are configured to provide correction of a wearer's ametropia. Furthermore the semi-finished lenses comprise, as will be disclosed in more details below, a holographic component 13 which remains present in the ophthalmic lenses obtained out of the semi-finished lenses. The holographic component can include at least one of a holographic mirror, a holographic filter and a holographic lens.

Figure 3:
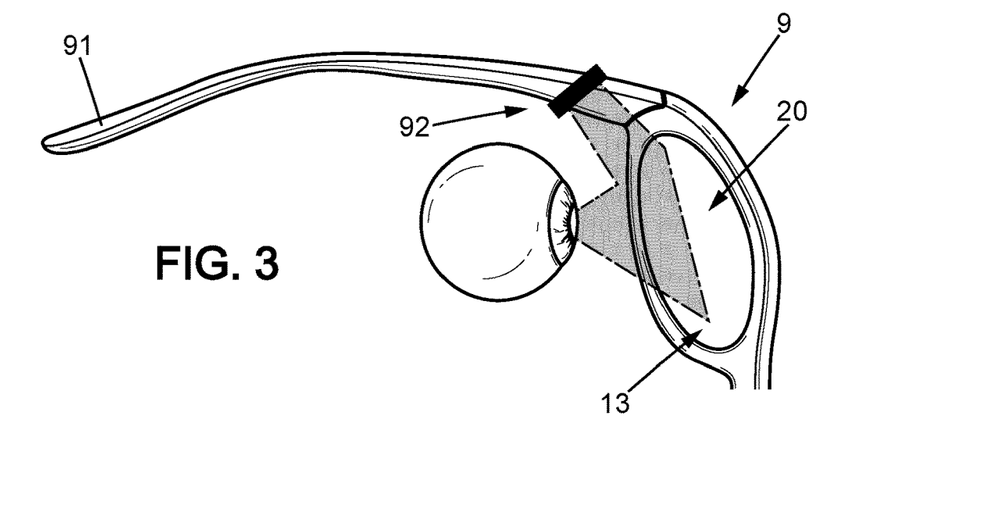
FIG. 3 schematically represents an optical device in which is inserted an ophthalmic lens with a holographic mirror.

As shown schematically in FIG. 3, according to a preferred embodiment, the holographic component 13 is a holographic mirror, and the ophthalmic lenses 20 achieved from the semi-finished lenses are adapted to be fitted into a Head-Mounted display device HMD 9, comprising a frame 91 in which the ophthalmic lenses 20 are fitted. The HMD 9 further comprises an image source 92 integrated in the frame 91 and configured for illuminating the holographic mirror 13 and to cause, upon reflection onto said holographic mirror, the visualization of a virtual image by the wearer, with the ophthalmic lens being configured to provide the wearer with correct vision of both the virtual image (image generated by the image source) and the real image (environment of the wearer).

A particular application is augmented-reality equipment in which an optical conjugation is implemented between the eye pupil and the image source. In this configuration, the HMD 9 may comprise a movable micro mirror interposed between the image source and the lens, and moving according to the position of the eye pupil in order to follow the eye pupil's motion. Furthermore, in this configuration, the holographic mirror recorded in the lens is configured to implement optical conjugation between the image source and the pupil. Given the very short distance between the holographic mirror and the pupil, this implies that the mirror has important power, for instance in the range of +40 D to +60 D.

Another possible application is an imaging system in which there is no conjugation with the eye pupil but instead the image source is located near the focal point of the holographic mirror and the holographic mirror is configured to send the virtual image to infinity.

Figure 1A:
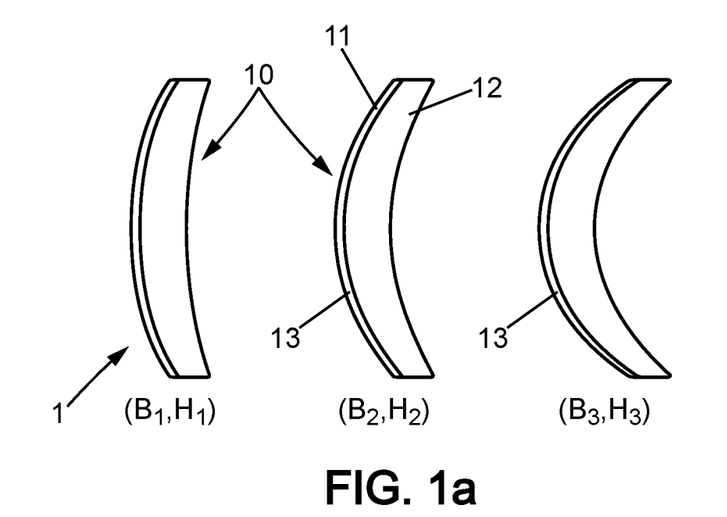
FIG. 1a depicts a set of semi-finished lenses according to an exemplary embodiment.
Figure 1B:
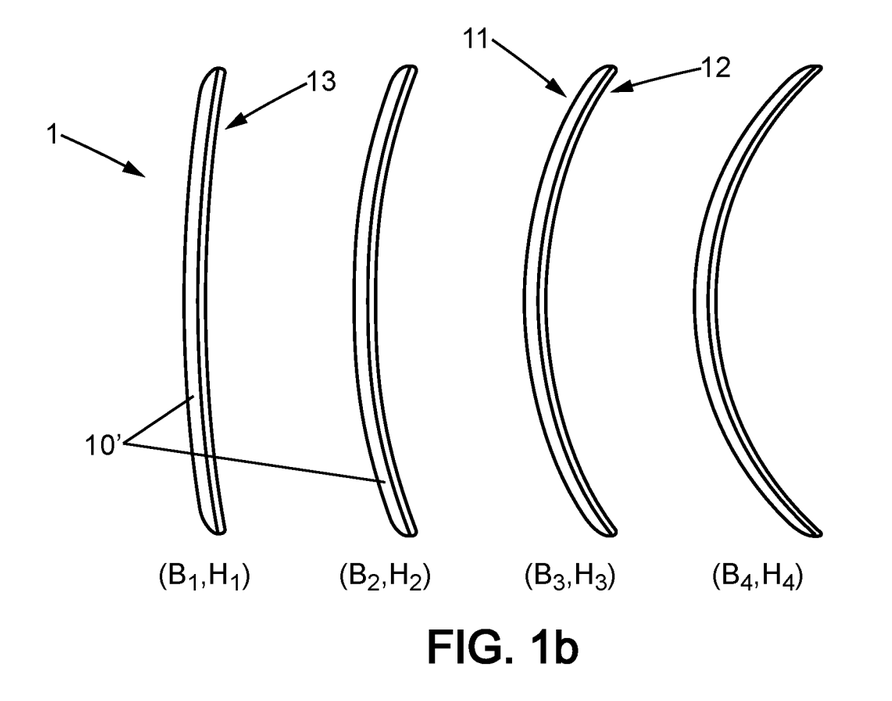
FIG. 1b depicts a set of semi-finished lenses according to another exemplary embodiment.

Back to FIGS. 1a and 1b, the set 1 of semi-finished lenses comprises a plurality of semi-finished ophthalmic lenses 10, 10'. A semi-finished ophthalmic lens is a lens which is not trimmed, which means that its peripheral shape has not been adjusted to the shape of a frame in which it will then be inserted. Furthermore a semi-finished lens does not provide the final power, also called target power, of the lens that is manufactured from the semi-finished lens.

A semi-finished lens may not be fully surfaced. In embodiments, the semi-finished ophthalmic lens 10 having two main surfaces including a front surface 11 and a back surface 12, the back surface being the surface intended to be closest to the wearer, only one of the front surface 11 and of the back surface 12 is surfaced. Surfacing is a sequence of operations comprising machining at least one of the front surface or back surface of the lens to provide its final geometry. The final correction is obtained by a later surfacing of the surface which is not yet surfaced. One or several coatings may then be provided on either surface to obtain the final optical and mechanical performances of the lens.

According to a first example, with reference to FIG. 1a, a semi-finished lens 10 may provide a power which is not the target power of the lens to be manufactured from the semi-finished lens. The target power can be obtained by later surfacing of the semi-finished lens. In this case, the SF lenses 10 of the set 1 may exhibit a minimal thickness of 4 mm, to allow further finishing and ensure that the SF lens will not deform during the later surfacing process. In particular, if the later surfacing process is performed with freeform devices, this minimum thickness ensures that the lens will not deform during its blocking during this surfacing process.

According to another example, with reference to FIG. 1b, the semi-finished ophthalmic lens 10' may be a plano lens 10' providing no power and intended to be later assembled to an auxiliary lens providing the desired power. As a the plano lens 10' does not have to undergo a later surfacing step, its thickness can be smaller than the thickness given earlier for other SF lenses. For instance, the thickness of the plano lens can be less than 2 mm.

By "plano lens" is meant a lens having no power and hence providing no correction to the wearer. The plano lens 10' may, in an embodiment, only provide a mechanical support for the holographic component recorded thereon. Alternatively, it may also provide an optical function in addition to the function of mechanical support.

In both cases, i.e. if the semi-finished lens 10, 10' is either a plano lens or a semi-finished lens providing optical power, the semi-finished lens may provide at least one optical function. The optical function may be: an amplitude filtering function, a spectral filtering function (such as edgepass such as shortpass or longpass, or bandpass filtering, or filtering of specific colors, for instance by tinting, or incorporating photochromic or electrochromic functions), or a polarization function. To provide said function the semi-finished lens 10, 10' may incorporate more than one layer.

The semi-finished lens 10, 10' can be at least partially tinted. According to an example, it may be formed in a material including a blue cut function, as disclosed in document WO2018/054984. The semi-finished lens 10, 10' may also include UV absorbing dye (such as the dyes marketed by BASF under the tradenames of TINUVIN® 477 or 479). If the holographic mirror 13 is recorded on the back surface of the semi-finished lens, the provision of a UV absorbing dye reduces the amount of UV reaching the holographic mirror 13, which reduces the yellowish aspect that such mirror may have while aging.

According to another example, the semi-finished lens comprises a photochromic layer such as a photochromic polyurethane layer.

According to another example, the semi-finished lens 10, 10' can comprise a polarizing cell or polarizing film. The polarizing cell can be formed of a stack of three layers of TAC-PVA-TAC (PVA standing for PolyVinyl Alcohol), or of a stack of three layers of PC-PVA-PC (PC standing for Polycarbonate). According to still another example, the semi-finished cell 10, 10' can comprise an electrochromic cell.

The semi-finished lens 10, 10' may also comprise a coating on an at least one main surface thereof, such as an abrasion-resistant coating (also known as Hard Multi-layer Coating) and/or an anti-reflection coating.

In an embodiment, an anti-reflection coating of Hard Multilayer Coating is provided on a main surface of the semi-finished lens opposite the main surface where the holographic component 13 is recorded. For example, if a holographic mirror 13 is recorded on a back surface of the semi-finished lens 10, 10', the anti-reflection or HMC coating can be deposited on the front surface of the semi-finished lens. An additional coating may also be deposited on the holographic component 13 after the latter has been recorded.

In an embodiment, an anti-reflection coating may be provided on a main surface of the semi-finished lens 10, 10' before recording the holographic component 13 on the opposite main surface thereof, and the anti-reflection coating may then be removed by later surfacing of the semi-finished lens. The temporary anti-reflection coating may reduce reflection during the recording of the holographic component and hence provide increase the quality of the holographic component.

With reference to FIGS. 1a and 1b, all the semi-finished lenses 10 of the set 1 have a base curve $B_i$ chosen among a limited number N of base curves, and the set comprises at least one semi-finished lens of each base curve among the number N of base curves. For instance, N is preferably lower than 10, preferably lower than 7, and for instance lower or equal to five base curves. The base curve is that of the finished surface of the SF lens. In an embodiment, the finished surface of the SF lenses of the set is the front surface. Thus the base curve is that of the front surface of the SF lenses. Therefore, the set of SF lenses comprises at least one SF lens of each base curve $B_i$ among the N base curves $(B_1, \ldots B_N)$, but no SF lens having a base curve different from the N base curves.

Each base curve corresponds to a respective range of target power that can exhibit a finished lens obtained from a SF lens having said base curve. Therefore the N base curves are preferably selected to address a range of target powers as wide as possible.

According to a non-limiting example, the set 1 of semi-finished lenses 10 can comprise SF lenses of a number N=6 base curves as defined in table 1 below, and corresponding to the respective ranges of target power:

TABLE 1

| Base curve | Range of target power |
|---|---|
| B1 = +1.75 D | S1 := −15 D < S1 <= −4.5 D |
| B2 = +2.75 D | S2 := −4.5 D < S2 <= −1 D |
| B3 = +3.75 D | S3 := −1 S < S3 <= 0.75 D |
| B4 = +6 D | S4 := 1 D < S4 <= 3.5 D |
| B5 = +6.75 D | S5 := 3.5 D < S5 <= 6 D |
| B6 = +8 D | S6 := 6 D < S6 <= 9 D |

According to an embodiment, the set 1 of SF lenses 10 may comprise subsets of lenses of different diameters for each base curve, in order for the SF lenses of the subset to adapt to different frame shapes. Therefore, for each base curve among the number N of base curves, the set 1 may comprise at least one SF lens of each of a number d of different diameters. The number d can be less than 10, for example less than 5.

According to a non-limiting example, the number d comprises 5 diameters as follows: 60, 65, 70, 75 and 80 mm.

Furthermore, each semi-finished lens 10 of the set 1 comprises a holographic component 13 recorded thereon, preferably a holographic mirror (HM). The holographic component 13 may extend over a whole cross-section of the SF lens, with the cross-section being the front surface, the back surface, or a section inside the SF lens, or over only a part thereof. Preferably, among the set of semi-finished lenses 10, 10', the holographic components 13 are all recorded on a same cross-section of the respective semi-finished lens, for instance on the front surface or back surface.

As indicated above, the recording of a holographic component implies illuminating a film of holographic recording material with at least a reference beam and an illumination beam.

Preferably, front and back surfaces of each semi-finished lens 10, 10' exhibits high optical quality for the later recording step, to permit illumination and interference of the wavefront coming on each surface.

Moreover, the SF lenses 10, 10' of the set are preferably made of low birefringence material, to allow the recording of a high quality holographic component. In fact, the quality of a hologram, and in particular the accuracy of the optical function performed by the holographic mirror, depends on the quality of the interference fringes created to record the optical function. This quality is related to the visibility V of the interference fringes, which is directly linked to the angle $\psi$ between the polarizations of the illumination beam, and the reference beam:

$$V(\psi) = V_{max} \cdot \cos(\psi)$$

where $V_{max}$ is the maximal visibility, ideally 1.

If the recorded substrate, i.e. the SF lens, is homogeneous, and in particular has low birefringence, the polarization angle is only linked to the recording setup, and can be easily optimized. However, if the substrate is birefringent, the angle can vary locally due to the substrate itself, which results in a decreased visibility of the fringes and hence a poor-quality of the holographic mirror.

It is here considered that a material having low birefringence is a material for which the visibility of the fringes over the surface of the semi-finished lens 10, 10' is at least 80% of the maximum visibility Vmax, which corresponds to a variation of the angle $\psi$ from about 0 to 38°, which in turn corresponds to less than the width of one fringe, with a bright fringe corresponding to parallel polarization states and a dark fringe corresponding to perpendicular polarization states.

The following materials have low-birefringence and are suitable for forming the SF lenses:
- Thermosetting polythiourethane resins marketed by Mitsui Chemicals Company under the tradenames of MR-6™, MR-7™, MR-8™, and MR-10™
- Allyl diglycol carbonate (ADC) also known as CR-39, or marketed by Essilor under the tradename Orma®,
- Trivex® material from PPG,
- 1.74 refraction index material,
- Mineral glass Configurations of Holographic Components The configurations $H_i$ of the holographic components 13 recorded on each SF lens, which is to say the optical functions imparted to the holographic components, depend on the base curve of the SF lens, such that the set 1 of SF lenses comprises a limited number M of configurations of holographic components, wherein each holographic component configuration $H_i$ is associated to a single base curve $B_i$ among the number N of base curves. Therefore the number M of holographic component configurations is superior or equal to the number N.

In an embodiment (like in the example shown in FIGS. 1a and 1b), there is only one holographic component configuration $H_i$ for each base curve $B_i$ of the SF lenses 10 of the set 1, meaning that the set of SF lenses comprises, for each base curve, SF lenses all having the same component configuration. Said configuration is preferably adapted to provide the holographic component with an optical power which is adapted to the target power of the final lens to be obtained from the SF lens according to the wearer's prescription, and to the base curve of the SF lens.

In an embodiment where the lens is integrated in a HMD, part of the wearer's correction, for instance astigmatism, may be provided by the image source of the HMD, in order to reduce the number of holographic component configurations per base curve.

In the embodiment where the lens is integrated in a frame comprising an image source, and where the holographic component is a holographic mirror configured to reflect a virtual image generated by the image source towards the wearer's eye, the holographic mirror configuration is also configured according to the type of image source, in order to ensure that a wearer sees correctly the natural image coming from the environment of the wearer and the virtual image generated by the image source and reflected by the holographic mirror, whatever the position of the holographic mirror (at the front or back surface of the lens).

As the base curves of the SF lenses are chosen to address a range of target powers, a holographic component configuration corresponding to a base curve is preferably adapted to provide best performance for the power being in the middle of the target range. The optical power that the holographic component needs to adapt to is thus set as the middle power of the range corresponding to the base curve.

Each configuration also depends on the location of the holographic component within the lens obtained from the SF lens. Indeed, if the holographic component is located on back surface of the lens, its configuration has to be adapted in order to take into account the optical power of the lens. In the case of a holographic mirror, the configuration of the mirror has to be adapted according to its location on the front or back surface of the lens, in order to take into account the path of light:

if the mirror is located on the back surface of the lens, then the virtual image is directly reflected by the mirror towards the wearer's eyes but the natural image is transmitted through the lens and mirror and thus undergoes the power of the lens, If the mirror is located on the front surface of the lens, the virtual image passes through the lens once, is reflected by the mirror and the passes through the lens a second time before reaching the wearer's eyes, whereas the natural image is transmitted through the mirror and then through the lens before reaching the wearer's eyes.

In the embodiment wherein the SF lens is a plano lens 10', the holographic component 13 is preferably recorded on the back surface 12 of the plano lens, as in the example shown in FIG. 1b. This allows that, if an optical function is incorporated in the plano lens, such as for instance a polar cell, or a photochromic or electrochromic cell, this optical function is only applied on the light incoming from the "real" image and not on the light coming from the image source and then on the light reflected on the mirror. Therefore there is no need to adapt the configuration of the holographic mirror to take into account the impact of the optical function. Furthermore, this configuration may also allow better seeing the virtual image, by improving the contrast during outdoor use of the lens, for instance.

In the embodiment wherein the SF lens is a lens having one finished surface and another surface which needs further surfacing in order to obtain the desired power for the final lens obtained from the SF lens, the finished surface is preferably the front surface, and the holographic component is recorded on the front surface or in the lens at the vicinity of the front surface, to allow surfacing of the back surface. As the surfacing implies removing some of the thickness of the SF lens starting from the back surface, the holographic component may preferably be recorded as close as possible from the front surface to allow the final lens to be thin enough. However according to another embodiment, the holographic component may be recorded on the back surface and the SF lens may be finished by surfacing the front surface thereof.

In an embodiment, there may be more than one holographic component configuration $H_i$ per base curve $B_i$ of the SF lenses, each configuration corresponding to a base curve being nevertheless adapted to the corresponding range of target powers of lenses made out of the SF lenses of said base curve.

For instance, for each base curve there may be a plurality of holographic component configurations according to different pupil distances of wearers. This is of particular advantage in the case where the holographic component is a holographic mirror that is configured to ensure optical conjugation between an image source of a HMD with the wearer's pupil. According to the example given earlier, there may be a number P=3 different configurations for respective pupil distances of wearers, for each base curve.

Moreover, for each base curve a number of HM configurations can be provided according to different wavelengths of light which can be reflected by the mirrors. As a non-limiting example, a first configuration of holographic mirror can be adapted to reflect red light, and another configuration can be adapted to reflect blue light or green light. This allows adapting a HM configuration to a type of display.

The embodiments detailed above according to which, a set of SF lenses may comprise several shapes of SF lenses for a given base curve, and a set of SF lenses may comprise several holographic component configurations Hi for a given SF base curve Bi, can be combined together.

Figure 2:
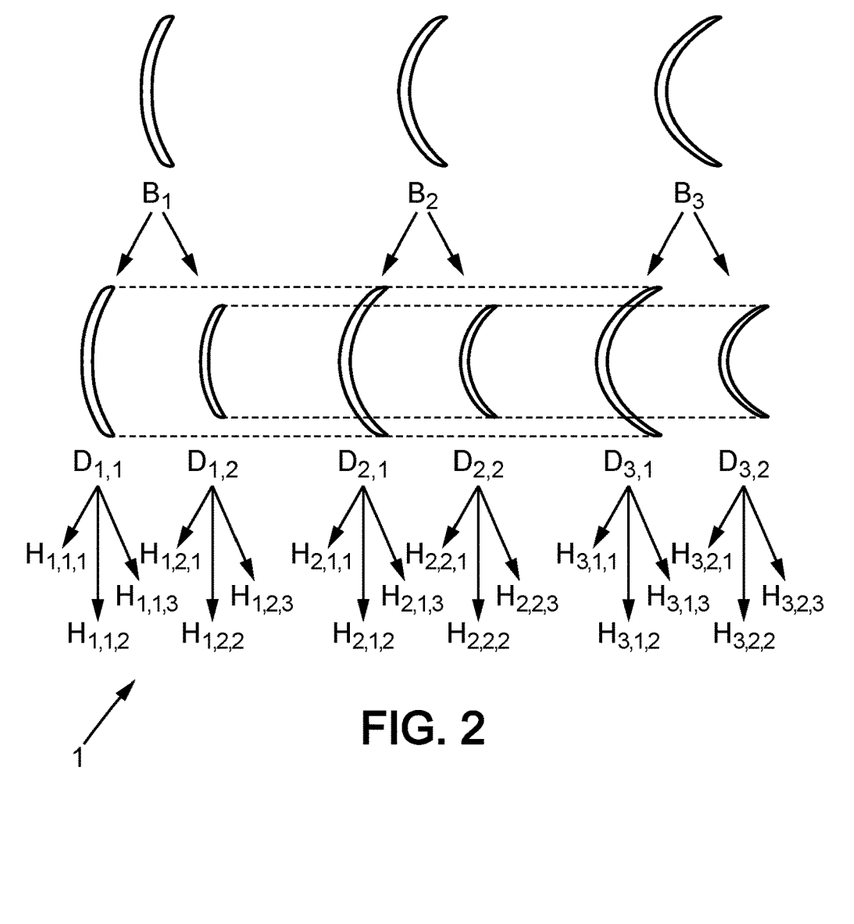
FIG. 2 depicts a set of semi-finished lenses according to another exemplary embodiment.

An example is given with reference to FIG. 2, in which an exemplary set 1 of semi-finished lens is shown. The set of SF lenses comprises SF lenses of three different base curves. The set 1 comprises, for each base curve $B_i$ (i=1, . . . 3), a subset of lenses having two different diameters $D_{i,j}$ (j=1,2 such that $D_{i,1}$ is constant for all the values of i and so is $D_{i,2}$, but $D_{i,1}$ is different from $D_{i,2}$) to adapt to different frames.

Furthermore, for each SF lens of a base curve the set 1 comprises three holographic component configurations $H_{i,j,k}$ (k=1 . . . 3), wherein the various configurations are adapted for different pupil distances of wearers.

Manufacturing of Semi-Finished Lenses

The manufacturing of a set of semi-finished lenses as described above comprises a preliminary step of determining a number N of power ranges to be provided by lenses manufactured from the SF lenses, and, for each power range, determining a base curve of the SF lenses suitable for providing a power within said power range.

A number of SF lenses of the different base curves may then be manufactured. As noted above, a number of SF lenses of the same base curves but exhibiting different diameters may be manufactured.

Then a number of configurations of holographic components is determined, and a holographic mirror is recorded on each SF lens.

Preferably, if the SF lens is a plano lens 10', the holographic mirror is recorded on the back surface thereof, as shown for instance in FIG. 1b. If the SF lens 10 is a lens having one finished surface and another surface to be finished to provide the desired power, the holographic component is recorded on the finished surface. In the example shown in FIG. 1a, the holographic component is recorded on the front surface and the back surface can then be finished.

The recording of a holographic mirror on a SF lens comprises depositing, on the surface on which the holographic mirror has to be recorded, a film F of holographic material. Holographic materials are known in the art. Such materials include dichromated gelatins and photopolymers. A non-limiting example of suitable photopolymer is marketed by Polygrama under the tradename of SM-TR™. In embodiments, the film may be formed between two walls so as to be encapsulated between the walls. The two walls are in that case part of the SF lens.

The film F holographic material can be deposited by polymer jetting, spray coating, dip coating, or by spin coating. It can be deposited on the front surface or the back surface of the SF lens 10, over the whole surface or only a specific area, for instance by pad printing. In the case of dip coating, the holographic material is deposited on both main surfaces of the SF lens, and one of the films can be removed during later surfacing of the SF lens.

Figure 4A:
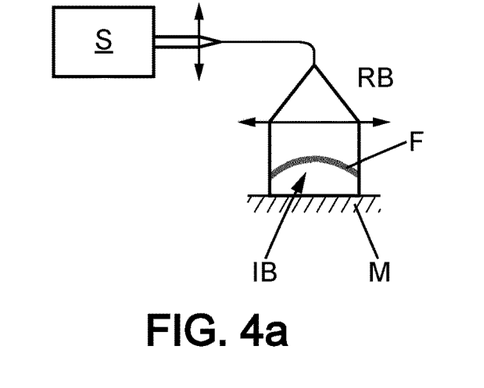
FIGS. 4a to 4c schematically show examples of optical arrangements for recording a holographic mirror, FIGS. 5a and 5b respectively show the use and removal of an anti-reflection coating before and after the recording of a holographic component.
Figure 4B:
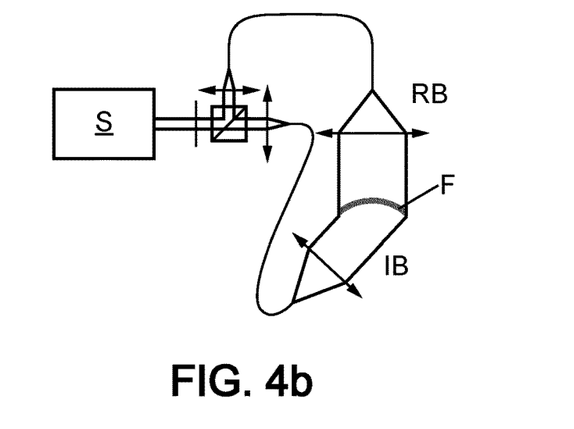
Figure 4C:
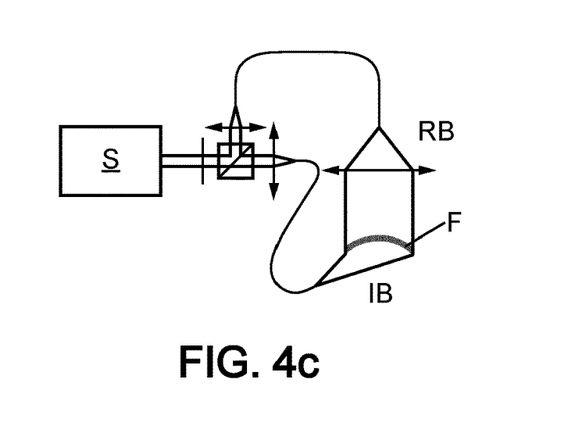

The recording of a holographic component then comprises insolating the film F of holographic material while exposing it in a holographic setup. With reference to FIGS. 4a to 4c, the recording of a holographic component is performed by generated interferences between a reference beam RB and an illumination beam IB, on the film F of holographic material. The two beams are coming from the same source S to allow interferences between the beams. The aperture, orientation of the beams, distance between the beams, the wavelength of the source and the number of beams (at least two although it can be more) allow the definition of the recorded optical function. In particular, the spatial configuration of the reference beam reflects the spatial configuration implemented for illuminating the mirror once the lens is fitted into a frame (orientation, distance, breadth—i.e. shape and size of the zone projected on the lens, etc.).

The light emitted by the light source S (typically a laser) is guided to the layer 11 of low birefringence material, for instance by optical fibers, which can include single-mode fibers, and preferentially polarization-maintaining (PM) single-mode fibers, large core area fibers and preferentially PM large core area fibres. A beam splitter is used to split the beam into the reference beam and the illumination beam.

One or more lenses selected from unifocal lenses, multi-focal lenses such as bifocal lenses and progressive addition lenses, may be used, as well as optionally a planar mirror, for example, to shape the illumination beam and reference beam according to the configuration of the holographic component that is to be recorded. The shape of the illumination beam and/or the reference beam may also be actively controlled with lenses with varying focal lengths or spatial light modulators (SLM), for example. In that case, the shape of the illumination and/or reference beams may be easily adapted for different base and/or different base or different diameter of the SM lens considered. This configuration takes into account, as explained above, at least the base curve of the SF lens on which the holographic component is recorded, the target power of the lens to be obtained from the SF lens, the position of the holographic component, the wearer's prescription, the function of the holographic component, data relative to the image source, including type of image source, optical and geometrical configuration of the image source, the shape of the frame into which the lens should be integrated, the characteristics of the lens, and in some cases either a pupillary distance of the wearer, etc.

Exemplary embodiments for the recording of the holographic mirrors are shown in FIGS. 4a to 4c. FIG. 4a presents a setup used to record a planar mirror. In this case the illumination beam IB is the reference transmitted beam reflected by a planar mirror M placed after the SF lens 10 carrying the film F.

FIG. 4b presents the setup used to record an off-axis planar mirror. In this case, the reference beam RB is a collimated beam and the illumination beam IB another collimated beam arriving from an off-axis position which corresponds to the later position of the image source relative to the holographic mirror. This implementation is suitable for a light source that is a SLM (spatial light modulator) or a light field display LFD.

FIG. 4c presents the setup to record an off-axis curved mirror. In this case the reference beam RB is a collimated beam and the illumination beam IB has for example the characteristics of the display or image source and arrives on the film F with the desired position, focus and angle. This implementation is suitable for HMDs comprising screens as image sources and/or requiring optical conjugation between the pupil and the image source.

Figure 5A:
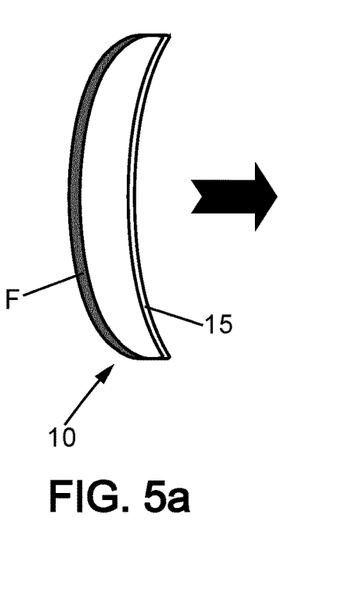
Figure 5B:
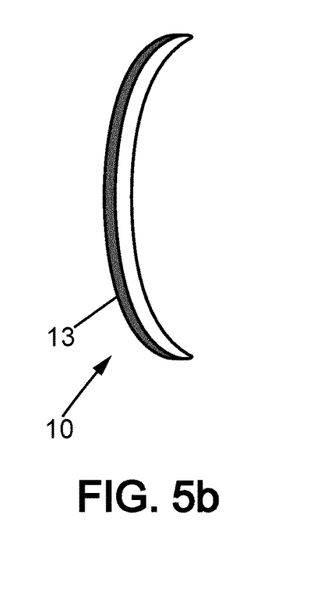

In an embodiment, as shown schematically on FIG. 5a, prior to recording the holographic mirror, an anti-reflective coating 15 is deposited on the surface of the SF lens 10 opposite the surface on which the holographic material F is deposited. The anti-reflective coating may be for instance a quarter-wave layer (also noted λ/4 layer) having a refraction index equal to the squareroot of the index of the material of the SF lens. A detailed example of quarter-wave layer is disclosed in patent U.S. Pat. No. 7,008,690. This anti-reflective coating reduces the amount of reflection at the time of recording and can then be removed after recording. In the embodiment wherein the surface opposite the HM is further surfaced, the removal of the anti-reflective coating can be performed during the surfacing of this surface (FIG. 5b)

In another embodiment, an anti-reflective coating can also be deposited on a main surface of the SF lens prior to depositing the holographic material F on the same surface. This also reduces undesired reflections during recording of the holographic component, in particular if the material forming the SF lens is of high index.

In order to obtain the set 1 of SF lenses 10, at least one SF lens is manufactured of each possible combination of the following parameters:
  Base curve,
  Each holographic component configuration per base curve, and
  If applicable, diameter of the SF lens.

Manufacturing of a Final Lens

Once the set 1 of SF lenses is obtained, it is possible to manufacture a lens 20 according to a wearer's data from one of the SF lenses of the set.

A first step is selecting a SF lens of the set according to the wearer's data, include prescription, and features regarding the fitting of the frame, lens and mirror to the wearer, such as pupillary distance, shape of the face, eye rotation centre position, etc.

The selection first comprises the determination of the base curvature $B_i$ of the SF lens 10 to be chosen according to the prescription of the wearer and hence according to the target power that the final lens has to provide. If the wearer power is given for a progressive lens, the chosen base curve is selected based on the far distance vision refraction.

According to a non-limiting example, the base curves of the set 1 are those given in table 1 above. For a given wearer, the target power to be achieved by the lens worn by the wearer is 0.5 D.

The base curvature $B_i$ suitable for this power is therefore the base curve B3 of +3.75D. A SF lens having this base curve is thus chosen.

In an embodiment, according to the size of the frame chosen by the wearer, the selected SF lens has suitable diameter.

In the embodiment wherein there are at least two holographic component configurations Hi for a given base curve Bi, the step of selecting the SF lens further comprises determining the HM configuration suitable to the wearer. The HM configuration may be chosen based on:
  the pupillary distance of the wearer,
  the type of image source that is going to be used to form the virtual image that has to be reflected by the holographic mirror, its geometry and location.

The method then comprises finishing the SF lens 10 to achieve the desired power.

Figures 6A, 6B:
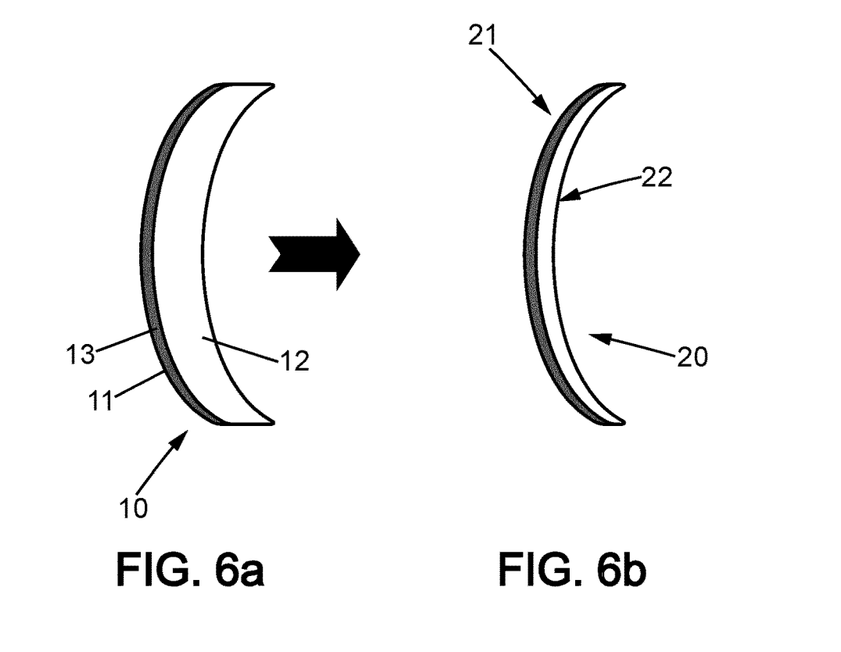
FIGS. 6a and 6b show a first example of the finishing of a semi-finished lens.

In the embodiment in which the SF lens 10 has a finished surface (for instance the front surface 11) and an unfinished surface (for instance the back surface 12), this step comprises finishing the unfinished surface to achieve the desired power. As shown on FIGS. 6a and 6b, the finishing can comprise removal of material from the unfinished surface so that the lens becomes thinner.

Figures 7A, 7B:
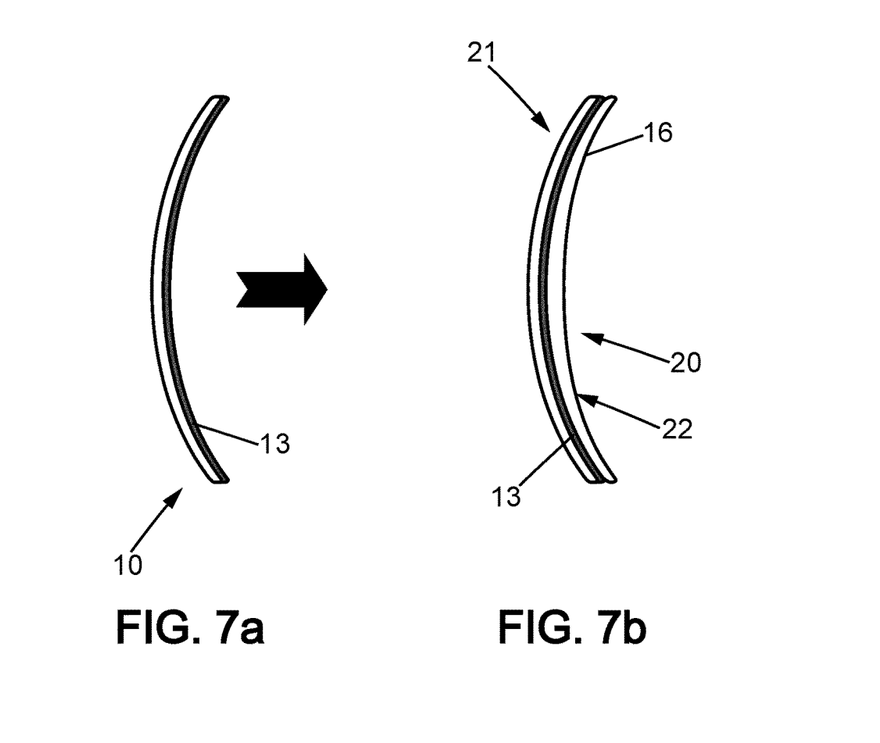
FIGS. 7a and 7b show a second example of finishing of a semi-finished lens.

In the embodiment in which the SF lens is a plano lens, the plano lens (FIG. 7a) incorporating the HM 13 may be assembled to an auxiliary lens 16 shaped to provide the desired power (FIG. 7b).

The assembling of the plano lens 10 to the auxiliary lens 16 can be performed by gluing, by additive manufacturing, or by a back injection process. During this last type of process the SF lens if put in a mold and injection material is provided on the back surface of the SF lens to form the auxiliary lens.

A final lens 20 is obtained having one front surface 21 and one back surface 22, one of these surfaces being formed by an initial front or back surface of the SF lens, and the other being obtained during finishing of the SF lens (either by surfacing the other surface or assembling the auxiliary lens 16).

The method can further comprise an additional step of coating at least the surface that has been obtained during finishing of the SF lens. The coating can be an abrasion-resistant coating (or hard coat), and/or an anti-reflection coating.

This step may also comprise coating both front and back surfaces of the final lens 20.

What is claimed is:

1. A set of semi-finished ophthalmic lenses, wherein each semi-finished ophthalmic lens is used in manufacturing of a finished ophthalmic lens of determined target power, comprising:
    a plurality of semi-finished ophthalmic lenses, each semi-finished lens having a base curve chosen among a number N of base curves, N being lower than 10, and including a holographic component recorded according to a holographic component configuration chosen among a limited number M of holographic components configurations, M being superior or equal to N,
    wherein each base curve among the N base curves is associated to a respective range of target powers of finished ophthalmic lenses to be manufactured from the semi-finished lenses having said base curve, each range of target powers being defined by minimum and maximum target power values, and all the ranges being centered on respectively different target power values,
    and each holographic component configuration among the M holographic component configurations is associated to a single base curve among the N base curves, such that two semi-finished ophthalmic lenses of the set have a holographic component according to a same holographic component configuration only when the two semi-finished ophthalmic lenses of the set have the same base curve, and
    each holographic component configuration associated to a base curve is configured such that the holographic component has an optical power adapted to a middle power of the range of target powers corresponding to the base curve.

2. The set of semi-finished ophthalmic lenses according to claim 1, wherein the plurality of semi-finished lenses have a same base curve and different diameters.

3. The set of semi-finished ophthalmic lenses according to claim 1, wherein each semi-finished lens is made of a low-birefringence material.

4. The set of semi-finished ophthalmic lenses according to claim 1, wherein each semi-finished lens is a plano lens.

5. The set of semi-finished ophthalmic lenses according to claim 1, wherein the holographic components are holographic mirrors configured to reflect a virtual image generated by an image source, and wherein each base curve is associated to a plurality of holographic mirror configurations among the limited number of configurations, said plurality of holographic mirror configurations associated to a determined base curve including:
    at least two holographic mirror configurations adapted to different ranges of pupillary distances of wearers,
    at least two holographic mirror configurations adapted to different image sources generating a virtual image to be reflected by a mirror, or
    at least two holographic mirror configurations adapted to reflect different ranges of wavelengths.

6. The set of semi-finished lenses according to claim 1, wherein the number of base curves is lower than 10, and each base curve is associated to a number of holographic component configurations lower than 5.

7. The set of semi-finished lenses according to claim 1, wherein each semi-finished lens comprises two opposite main surfaces, a holographic component is recorded on one main surface of each semi-finished lens, and each semi-finished lens further comprises an anti-reflection coating on other main surface.

8. A method of manufacturing a set of semi-finished ophthalmic lenses wherein each semi-finished ophthalmic lens is used in the manufacturing of a finished ophthalmic lens of determined target power, the method comprising:
    determining a number N of target power ranges, each range of target powers being defined by minimum and maximum target power values, and all the ranges being centered on respectively different target power values;
    for each determined target power range, determining a respective base curve of a semi-finished lens such that the base curve is suitable to be used in the manufacturing of a finished ophthalmic lens having a power within the determined target power range, wherein each semi-finished lens has the base curve chosen among a number N of base curves, N being lower than 10, and including a holographic component recorded according to a holographic component configuration chosen among a limited number M of holographic components configurations, M being superior or equal to N;
    for each base curve among the N base curves, determining a respective holographic component configuration of a holographic component to be recorded on a semi-finished lens having said base curve; and
    manufacturing at least one semi-finished lens of each determined base curve, wherein
    each holographic component configuration among the M holographic component configurations is associated to a single base curve among the N base curves, such that two semi-finished ophthalmic lenses of the set have a holographic component according to a same holographic component configuration only if they have the same base curve, and
    each holographic component configuration associated to a base curve is configured such that the holographic component has an optical power adapted to a middle power of the range of target powers corresponding to the base curve.

9. The method according to claim 8, wherein the manufacturing of each semi-finished lens further includes, prior to recording the holographic component, providing an anti-reflection coating on at least one main surface of the semi-finished lens.

10. A method of manufacturing an ophthalmic lens adapted to be worn by a wearer, wherein the ophthalmic lens has a predetermined target power according to a vision of the wearer to be corrected, the method comprising:

selecting a semi-finished lens among a set of semi-finished ophthalmic lenses, wherein the semi-finished lens is selected to have a base curve corresponding to a target power range to which belongs the predetermined target power, each range of target powers being defined by minimum and maximum target power values, and all the ranges being centered on respectively different target power values; and finishing the semi-finished lens to achieve the predetermined target power, wherein in the set of semi-finished ophthalmic lenses, each semi-finished ophthalmic lens is used in manufacturing of a finished ophthalmic lens of determined target power, each semi-finished lens has a base curve chosen among a number N of base curves, N being lower than 10, and including a holographic component recorded according to a holographic component configuration chosen among a limited number M of holographic components configurations, M being superior or equal to N, wherein each base curve among the N base curves is associated to a respective range of target powers of finished ophthalmic lenses to be manufactured from the semi-finished lenses having said base curve, each range of target powers being defined by minimum and maximum target power values, and all the ranges being centered on respectively different target power values, and each holographic component configuration among the M holographic component configurations is associated to a single base curve among the N base curves, such that two semi-finished ophthalmic lenses of the set have a holographic component according to a same holographic component configuration only when the two semi-finished ophthalmic lenses of the set have the same base curve, and each holographic component configuration associated to a base curve is configured such that the holographic component has an optical power adapted to a middle power of the range of target powers corresponding to the base curve.

11. The method according to claim 10, wherein the semi-finished lens has a front and a back surface, and a holographic component is provided on the front surface or between the front surface and the back surface, and wherein finishing the semi-finished lens further includes surfacing the back surface of the semi-finished lens or assembling the semi-finished lens to an auxiliary lens whose optical power is adapted such that a power of a lens comprising the semi-finished lens and the auxiliary lens corresponds to the predetermined target power.

12. The method according to claim 10, wherein selecting a semi-finished lens further comprises selecting a holographic component configuration of the semi-finished lens among a plurality of configurations associated to the base curve of the semi-finished lens.

13. The method according to claim 12, wherein a holographic component is a holographic mirror intended to reflect a virtual image generated by an image source, and the selecting the holographic component configuration is performed according to at least one of the following:

a pupillary distance of the wearer, a prescription of the wearer, data relative to the image source, including type of image source, optical and geometrical configuration of the image source, a shape of a frame in which a finished lens obtained from the semi-finished lens is to be integrated, characteristics of the lens, and an optical function and characteristics recorded in the mirror.

14. The method according to claim 13, wherein the holographic mirror is intended to provide optical conjugation between the image source and a user's pupil, and the selecting a holographic mirror configuration is performed according to the pupillary distance of the wearer.

* * * * *